(12) United States Patent
Vismara et al.

(10) Patent No.: US 12,330,960 B2
(45) Date of Patent: Jun. 17, 2025

(54) APPARATUS FOR THE DESALINATION OF SEA WATER

(71) Applicant: Mario Vismara, Casatenovo (IT)

(72) Inventors: Mario Vismara, Casatenovo (IT); Edoardo Borghini, Milan (IT)

(73) Assignee: Mario Vismara, Casatenovo (IT)

( * ) Notice: Subject to any disclaimer, the term of this patent is extended or adjusted under 35 U.S.C. 154(b) by 393 days.

(21) Appl. No.: 17/629,076

(22) PCT Filed: Jul. 22, 2020

(86) PCT No.: PCT/IB2020/056880
§ 371 (c)(1),
(2) Date: Jan. 21, 2022

(87) PCT Pub. No.: WO2021/014369
PCT Pub. Date: Jan. 28, 2021

(65) Prior Publication Data
US 2022/0298027 A1    Sep. 22, 2022

(30) Foreign Application Priority Data

Jul. 23, 2019    (IT) .......................... 102019000012663

(51) Int. Cl.
*C02F 1/04* (2023.01)
*B01D 1/26* (2006.01)
(Continued)

(52) U.S. Cl.
CPC ................ *C02F 1/041* (2013.01); *B01D 1/26* (2013.01); *B01D 1/28* (2013.01); *B01D 5/006* (2013.01); *C02F 1/043* (2013.01); *C02F 2103/08* (2013.01)

(58) Field of Classification Search
CPC . C02F 1/041; C02F 1/043; B01D 1/26; B01D 1/28; B01D 5/006
See application file for complete search history.

(56) References Cited

U.S. PATENT DOCUMENTS 3,099,607 A    7/1963    Lustenader
4,585,523 A *  4/1986    Giddings ................. B01D 1/22
                                                         165/133

(Continued)

FOREIGN PATENT DOCUMENTS

DE         3540730 A1    5/1987

*Primary Examiner* — Renee Robinson
(74) *Attorney, Agent, or Firm* — Dickinson Wright PLLC; Andrew D. Dorisio

(57) ABSTRACT

An apparatus for the desalination of sea water through vapour compression distillation, comprising a thermally insulated container element (12) inside which at least two cages (14) are arranged, comprising at least one block (16) consisting of stacked elements comprising layers of condensing chambers (17) and evaporation interspaces (19) intervalled with respect to each other, at least two low pressure compressors (18), said container element being modular, the apparatus comprising at least one tank (22) for heating the supply saline water, at least one further tank (24) for collecting condensed water, means (25) for supplying thermal energy at the at least one supply tank (22) and further means (26) for supplying thermal energy at the container element (12), one or more heat exchangers (20) of the counterflow type for preheating the supply sea water and in connection with the concentrated saline water purges (40), with the condensed fresh water (42), with the vapour purges (44 and 44), with the at least one tank (22), with the at least one further tank (24) and with the source of sea water (41).

20 Claims, 9 Drawing Sheets

(51) Int. Cl.
*B01D 1/28* (2006.01)
*B01D 5/00* (2006.01)
C02F 103/08 (2006.01)

(56) References Cited

U.S. PATENT DOCUMENTS

| | | | |
|---|---|---|---|
| 10,471,367 B1* | 11/2019 | Antar | B01D 1/04 |
| 2016/0158666 A1* | 6/2016 | Winandy | B01D 5/0009 |
| | | | 202/185.1 |
| 2019/0161366 A1* | 5/2019 | Al-Azazmeh | B01D 3/007 |

* cited by examiner

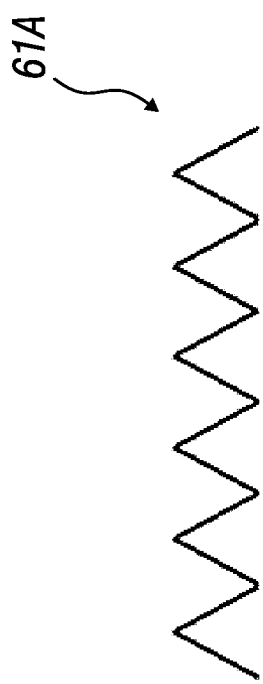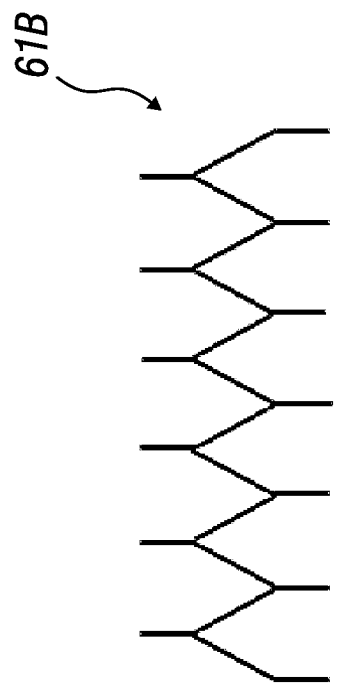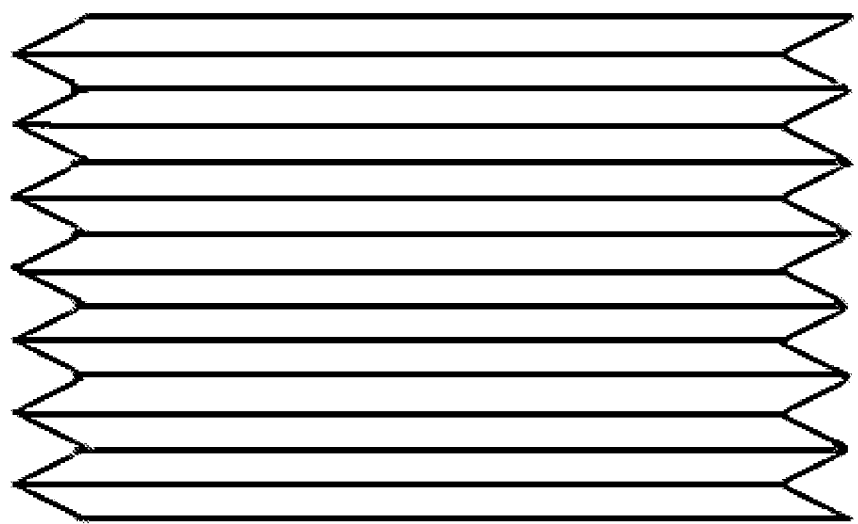

APPARATUS FOR THE DESALINATION OF SEA WATER

TECHNICAL FIELD

The present invention relates to an apparatus for the desalination of sea water.

BACKGROUND

More in particular, the present invention relates to an apparatus for the desalination of sea water which operates according to the process known as "vapour compression distillation" i.e. the technology in which, by means of mechanical compression or a "jet stream", the vapour produced by heated seawater is compressed. The vapour thus compressed condenses and the latent heat of such condensation is used to produce new evaporation of saline water, while the condensed vapour is the final product, i.e., desalinated water which can be used for food, industrial and similar uses.

However, the solutions conventionally known for the desalination of sea water using the vapour compression distillation process have some significant drawbacks described below.

A drawback of the conventional processes for desalination through vapour compression lies in the fact that they, by virtue of the fact that they typically operate at pressures lower than atmospheric pressure, require a rather complex plant with a compressor of considerable size, vacuum pumps and pressure-resistant metal structures. In operative terms, the choice of operating at a pressure lower than the ambient pressure also reveals drawbacks such as, for example, the fact that the value of the coefficient of kinematic viscosity the vapour becomes much higher and this entails the need to have more ample spaces for the condensation and evaporation areas and thus a reduction of the heat exchange surfaces per volume unit. Furthermore, at low operating pressures, the unit energy consumption of compression is much more sensitive to the pressure increase and, thus, it is very demanding, in terms of higher energy consumption, to operate with high temperature delta ($\Delta T$) over the boiling temperature. Since such temperature delta, together with the size of the heat exchange surfaces, determines the kinetics of the process, the above entails a considerable and significant disadvantage of the known solutions operating according to the "vapour compression distillation" type of process, linked to the fact that, in view of the high costs of these plants, it is inevitable that energy efficiency must be significantly sacrificed in favour of greater kinetics.

A further disadvantage of the known technology lies in the fact that since the saline solution is at direct contact with the container, it is necessary that it be made of corrosion-resistant materials, resulting in structures which, having to also resist pressure, are particularly expensive and heavy, and above all, not easy to access for routine and extraordinary maintenance operations.

A further drawback of conventional processes is lies in the fact that evaporation takes place in a single stage, with a single compressor which, therefore, operates at a single pressure higher than the pressure that would be required in the initial evaporation of the supply water and, furthermore, for the most part, the evaporation takes place on sea water already close to the final saline concentration of purge, which requires a higher evaporation temperature and, therefore, a greater compression work and greater unit consumption of electric energy.

A further drawback of the conventional processes lies in the fact that they are rather complex and require the presence of vacuum pumps and, by evaporating by boiling saline water, they require devices such as "demister" for eliminating the droplets of saline water produced in boiling.

A further drawback of conventional processes lies in the fact that they have structures which are poorly modular and, except for plants of smaller dimensions, they are not movable and easily transportable.

SUMMARY

The object of the present invention is to overcome the aforementioned drawbacks.

More in particular, the object of the present invention is to provide an apparatus for the desalination of sea water according to the "vapour compression distillation" technique which allows to use much more essential, simpler, lighter, less expensive operating structures, more accessible to a widespread use than conventional ones.

A further object of the present invention is to be able to increase—in a very sensitive manner—the extent of the heat exchange surfaces per volume unit of the overall dimensions of the device and thus to be able to reduce, without loss of quantitative yield of condensate, the thermal differential to be applied between the condensation area and the evaporation area, while simultaneously improving energy efficiency.

A further object of the present invention is to be able to obtain, thanks both to the reduction of the aforementioned thermal differential and to a particular arrangement of the evaporation surfaces, the evaporation of the sea water without boiling.

A further object of the present invention is to be able to evaporate the sea water supplied in a single container, but in several steps of progressive concentration thereof in order to take advantage of the lower energy required in the evaporation at the initial concentrations.

A further object of the present invention is to be able to exploit plastic materials—as diaphragms between the evaporation area and the condensation area—which are lighter, less expensive and not subject to corrosion, unlike the diaphragms conventionally currently used.

A further object of the present invention is to provide a modular desalination apparatus so as to be easily adapted to variable production capacities.

A further object of the present invention is to provide a desalination apparatus suitable to provide a more efficient solution to the problems related to the disposal of the atmospheric gases present in the supply sea water.

A further object of the present invention is to provide a desalination apparatus which facilitates access and inspection as well as periodic maintenance operations.

A further object of the present invention is to provide the users with an apparatus for the desalination of sea water suitable to allow a high level of resistance and reliability over time and, in addition, such to be easy and cost-effective to manufacture.

These and other objects are attained by the invention having the characteristics according to claim 1.

According to the invention, herein provided is an apparatus for the desalination of sea water through vapour compression distillation, comprising a thermally insulated container element inside which at least two cages are arranged, comprising at least one block consisting of stacked elements comprising layers of condensing chambers and evaporation interspaces intervalled with respect to each other, at least two low pressure compressors, said container element being modular, the apparatus further comprising at least one tank for heating the supply saline water, at least one further tank for collecting condensed water, means for supplying thermal energy at the at least one supply tank and further means for supplying thermal energy at the container element, one or more heat exchangers of the counterflow type for preheating the supply sea water and in connection with the concentrated saline water purges, with the condensed fresh water, with the vapour purges, with the at least one tank, with the at least one further tank and with the source of sea water. Advantageous embodiments of the invention are outlined by the dependent claims.

BRIEF DESCRIPTION OF THE DRAWINGS

The construction and functional characteristics of the apparatus for the desalination of sea water of the present invention will be clearer from the following detailed description in which reference is made to the attached drawings representing a preferred and non-limiting embodiment thereof and wherein:

FIGS. 7B 7C and 7D schematically illustrate exemplifying forms of inserts of an interspace as of the preceding figures.

DETAILED DESCRIPTION

Figure 1:
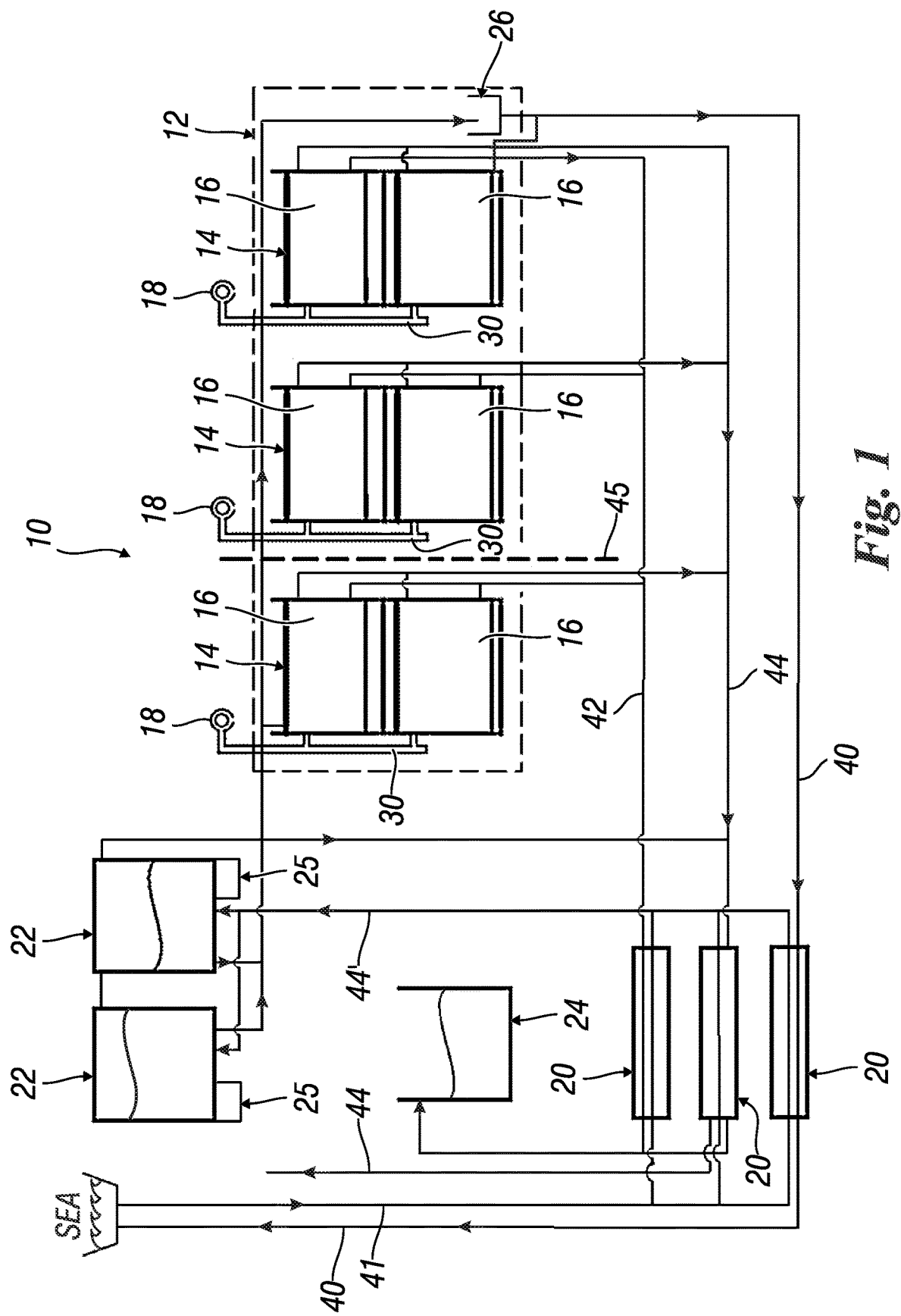
FIG. 1 schematically represents the apparatus for the desalination of sea water of the present invention.

With reference to the above figures, the apparatus for the desalination of sea water according to the invention, indicated in its entirety with 10 in the diagram of FIG. 1, comprises a thermally insulated container element 12 inside which there are arranged at least two cages 14, each comprising at least one block 16 consisting of stacks defined by adjacent layers of condensing chambers intervalled with evaporation interspaces (better described below) (in this sense the container element 12 is modular, considering the fact that the number of cages 14 and the number of blocks 16 of said cages can be varied according to specific requirements and, thus, the number and operation of said cages 14 is modular according to specific requirements), at least two compressors 18, one or more heat exchangers 20 of the counterflow type, at least one tank 22 for collecting and final heating of the supply 5 water preheated by the heat exchangers 20, at least one further tank 24 for collecting the condensed water, means 25 for supplying thermal energy (i.e., a heater) arranged at the at least one collection and heating tank 22 and further means 26 for supplying thermal energy (e.g, a heater) arranged at the container element 12.

In the preferred embodiment shown in the figures, unlike what usually happens in the prior art the container element operates at ambient pressure so as not to require a heavy structure which must withstand the pressures/depressions; however, according to alternative embodiments, it can operate at pressures higher or lower than ambient pressure. The walls thereof are insulated having to operate at temperatures higher than the ambient temperatures; the insulation together with the presence of high flows of unsaturated vapour therein, which increase the coefficient of heat transfer reduce the condensation of the vapour on the walls, which is however recoverable, to very low values.

Each of the blocks 16 arranged in the cages 14 arranged in the container element 12, as better described hereinafter, comprises stacks consisting of numerous layers of thin condensing chambers consisting of sheets made of metal material or preferably consisting of plastic films or extruded plastic sheets of the twin-wall or cellular type alternating with thin interspaces arranged in series adjacent to each other.

The at least two compressors 18 are of the low-pressure operating type (operating at differentiated pressure) and they are preferably (but not exclusively) arranged above the container element 12 so as to suction the vapour produced in said container element 12 and to convey it to each block 16 by means of pipes or conduits 30 at a pressure such to ensure that the condensation thereof in the condensing chambers of the blocks 16 can be obtained at a temperature suitable for evaporating the saline water which is supplied into the interspaces (as detailed hereinafter, such operation occurs with increasing compression pressure as the passage from one block 16 to the next one occurs, with the saline concentration increasing together with the increase in the evaporation temperature and the level of unsaturation of the vapour produced, but with the overall pressure remaining generally unchanged).

The heat exchangers 20 of the counterflow type are used to preheat the supply saline water (for example, characterised by a degree of about 35 ppt (parts per thousand) of salinity) by means of i) of purge saline water (indicated by the line 40 of the diagram of FIG. 1, water coming from the last block and from the further means 26 for supplying thermal energy) which has reached a preselected concentration (for example, equal to about 70 ppt, i.e. with a saline concentration substantially twice the initial one), ii) of water that was condensed (coming from the container element 12 as indicated in FIG. 1 by the line 42 and, more in particular from the blocks 16 of each cage 14—from the lower part of said blocks) and iii) of vapour purges coming from the at least one tank 22 for collecting and heating the supply water and from the purges of the blocks 16 coming from the upper part of said blocks and indicated by the line 44) carried out for the elimination of the atmospheric gases present in the supplied water.

The at least one supply tank 22 is used to complete the heating of the supply sea water which, drawn from the sea (as indicated by the reference number 41 in FIG. 1) and after having passed through the heat exchangers 20 in counterflow and therefore preheated, it is brought to the operating temperature, i.e. the boiling temperature (for example, to slightly more than 100° C. if it is decided to operate at atmospheric pressure in the container element 12) before being supplied into the blocks 16 of the cages (the tanks 22, are preferably more than one both to allow a longer period of slight boiling (so as to eliminate a greater amount of atmospheric gases dispersed in the supply water) and if it is considered appropriate that, after boiling the water, the same be left for some time to settle the solid particles/particulates in suspension); in addition, the boiling vapour of this tank 22 is also joined to the vapor of the vapour purges (line 44 of FIG. 1) for the pre-heating of the supplied water in counterflow.

In the case of larger plants, the container element 12 can be provided with separation septa or partitions 45 between the cages 14 (to define several stages) with a perforated surface, and having the function of facilitating a unidirectionality in the movement of the vapour from the last compartment to the first.

Figure 2:
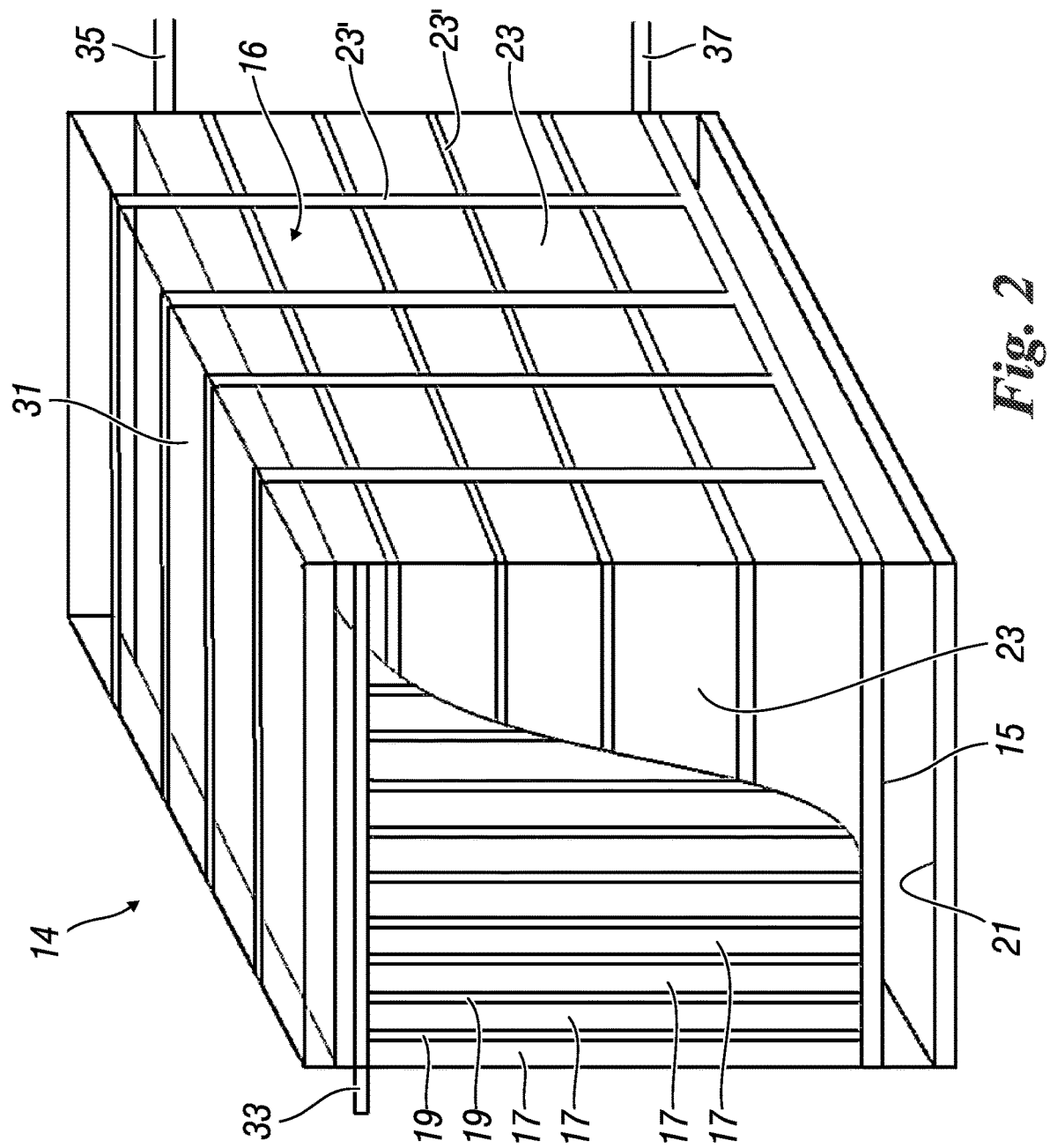
FIG. 2 schematically illustrates the structure of a constituent element or component (condensing chambers block) of the apparatus of FIG. 1.

With reference to FIG. 2, schematised is a cage 14 arranged in the container element 12 and provided with the block 16 consisting of the stacks defined by adjacent layers of condensing chambers.

The cage 14 consists of a robust structure which contains and supports a block 16 formed by a plurality of condensing chambers 17 and a plurality of evaporation interspaces 19 arranged between the condensing chambers (substantially the evaporation interspaces alternate with each condensing chamber).

The cage 14 has a bottom 15, consisting of a perforated sheet (or a mesh supported by a grid) which supports said block 16 consisting of the condensing chambers 17 separated by the evaporation interspaces 19, with such sheet of the bottom 15 being slightly deviated/raised with respect to a collection tank 21 having the function of collecting the saline solution percolated by the block 16 and which, as indicated above, is perforated to allow the passage of vapour formed in the evaporation interspaces 19.

The cage 14 comprises side walls 23 defined by sheets/plates which, starting from the perforated sheet of the bottom 15, rise to a few cm above the upper edge of the condensing chambers 17 and they are reinforced outside by crosspieces 23' given that—without prejudice to the case where the condensing chambers 17 consist of extruded sheets, for example, of the twin-wall or cellular type, —they must resist the pressure exerted by the compressed vapour in the condensing chambers 17 which pushes on the side walls with a force which, in the operation of the apparatus at atmospheric pressure, is comprised between about 1000 and 2000 kg/m2; the greater height of the side sheets/plates with respect to that of the condensing chambers 17 allows to constitute and contain, above the stack consisting of the condensing chambers 17 and the evaporation interspaces 19, a saline water layer 31.

The cage 14 also comprises a pipe 33 for supplying the compressed vapour (arranged in the upper part of the cage on the opposite side with respect to the collection tank 21), a pipe 35 for purging the vapour with high levels of aerobic gases (also arranged in the upper part of the cage on the opposite side with respect to the pipe 33) and a further pipe 37 for collecting the condensed water (arranged in the lower side of the cage 14).

The collection tank 21 has the function of collecting the saline solution percolated by the block 16 and, in particular, the saline solution percolated along the walls that delimit the interspaces 19, being subjected to a certain concentration of salinity following the evaporation; depending on the percolation rate and the level of saline concentration reached, such water is partially returned to the supply saline water layer 31 of the same block or conveyed to a subsequent evaporation block or lastly purged (in this case, the purge is conveyed to a heat exchanger 20 in counterflow with the supply sea water, in order to recover its thermal content as much as possible (as also occurs with the contents of the purges of the pipe 35 and of the further pipe 37).

Figure 3:
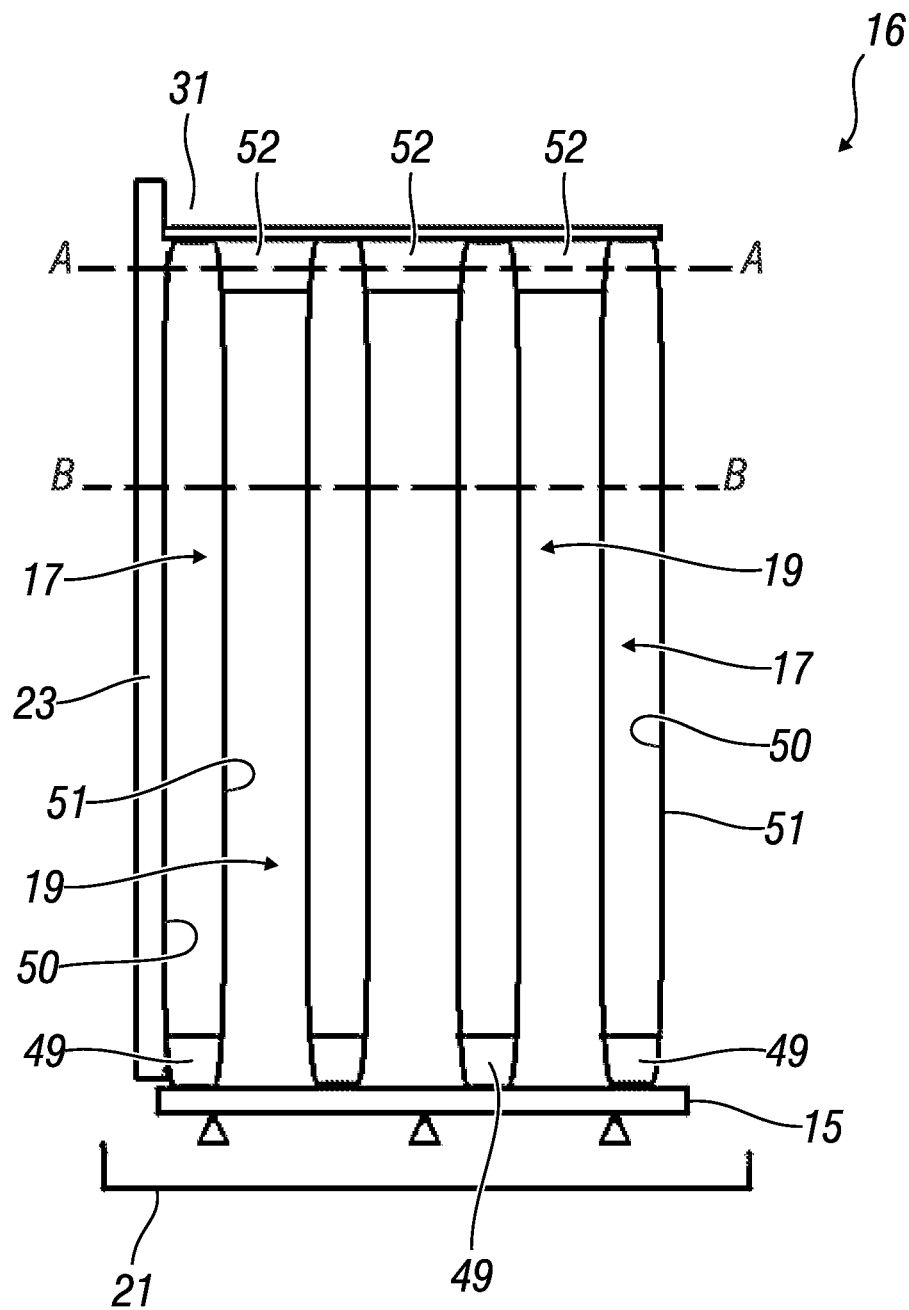
FIG. 3 schematically illustrates a section according to a vertical plane of the component of FIG. 2.
Figure 4:
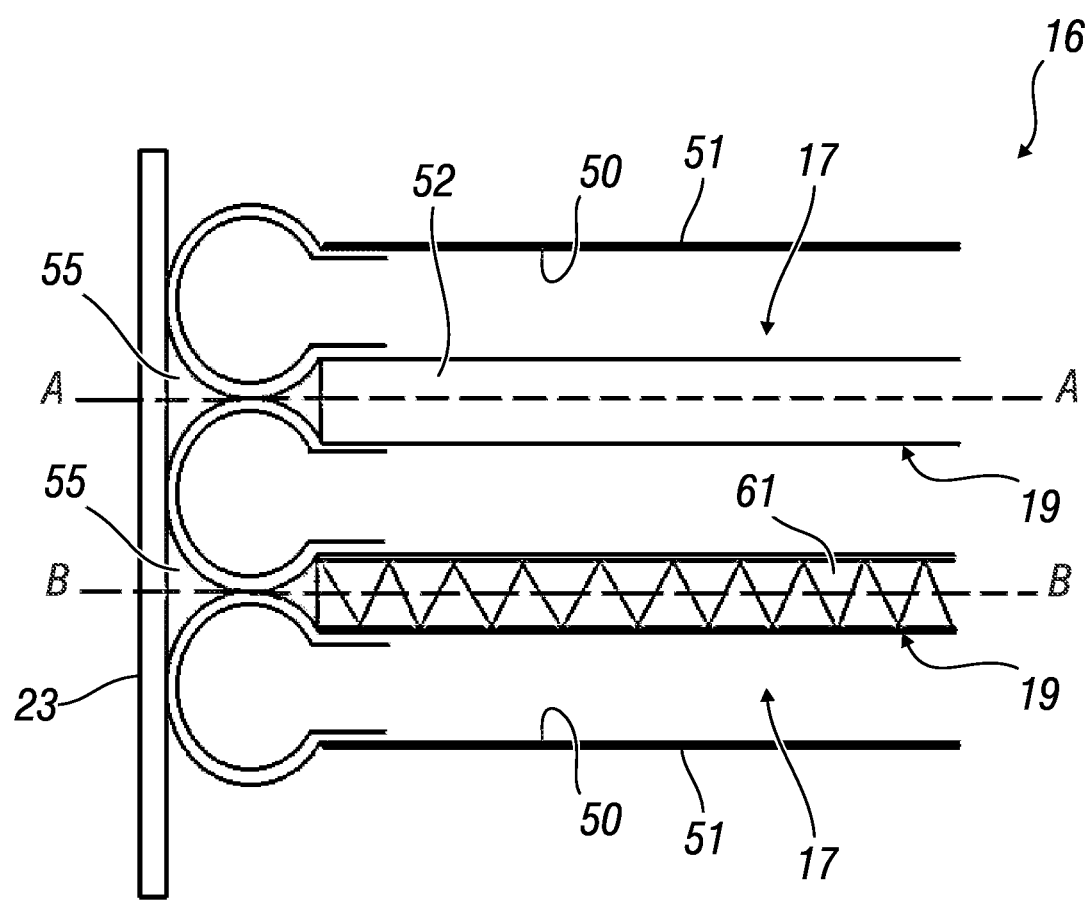
FIG. 4 schematically illustrates a section according to a horizontal plane of the component of FIG. 2.

FIGS. 3 and 4 show a cross-sectional view of the block 16 of the cage 14 comprising the condensing chambers 17 and the evaporation interspaces 19 which alternate between said condensing chambers 17 as described above.

Preferably, but not exclusively, the condensing chambers 17 consist of a film 50 preferably of the plastic type and they are preferably covered by a thin layer of hydrophilic fabric 51 which performs a plurality of functions such as, for example: a) allowing the percolation of the saline solution and constituting a privileged path for the saline solution that percolates into the collection tank 21 (so that it can be uniformly conveyed at contact with the hot surface of the film); b) with the albeit poor roughness thereof, to facilitate the mixing of the percolating saline solution so as to prevent exclusively laminar motion and to improve the coefficient of thermal exchange; c) carefully calibrating the deformability and/or elasticity of the fabric 51 to regulate the deformation induced by the pressure differential on the plastic film 50 which presses against the spacers 61 arranged in the interspace 19: the film 50 thus takes an undulated profile with grain directed downwards hence improving the thermal exchanges since the surface tension forces make the layers of percolating and condensing water to take differentiated thicknesses which determine a greater value of the average coefficients of thermal exchange with respect to those of the flat surfaces; d) protecting the plastic film 50 of the condensing chambers 17 against the risks of friction with the spacers 61 inside the interspaces 19.

The interspaces 19, at an upper end portion opposite the end portion facing toward the bottom 15 of the cage 14, comprise caps 52 made of rubber and/or spongy material which close said interspaces 19 at the top and partially press against an upper portion of the condensing chambers due to the elastic force thereof and/or due to the pressure exerted by the compressed vapour in said condensing chambers 17.

The presence of such plugs 52, together with the presence of the sheets/plates 23 of the side walls of the cage 14 which rise above the level of the condensing chambers 17, allows formation, above the stack of condensing chambers 17 and interspaces 19 contained in the block 16 of the cage 14, of a supply saline solution layer 31; this saline solution of said layer 31 can percolate by passing suitably through a layer 54 (arranged between said layer 31 of saline solution and the plugs 52) acting as a filter to prevent any particulates present in the supply saline solution from clogging the device, with said layer 54 being possibly variously made and, for example, it may be made of porous material, hydrophilic cotton or the like or sand and the like suitable for the purpose.

The interface part of the upper part of the condensing chambers 17 with the side walls 23 of the cage 14, where the plug 52 is not available or cannot be used, has sealing elements 55 whose function is to prevent uncontrolled percolation of liquid; the amount of water that percolates along the walls of the condensing chambers 17 is the result of several factors that are defined by the characteristics of the fabric 51 that covers the condensing chambers 17 (with such fabric which, if necessary, can be combined with another more permeable fabric in this small upper portion), including the thickness, nature and pressure to which the elastic plug 52 is subjected and the thickness of the saline solution layer 31; this characteristic offers different and multiple options for adjusting the percolate flow.

The condensed water is collected on the bottom of the condensing chambers 17 (on the opposite side with respect to the arrangement of the plugs 52) forming a layer 49 of condensate which is then conveyed, as better described hereinafter.

According to alternative embodiments, the condensing chambers 17 can be made as extruded sheets of the twin-wall or cellular type which, even in the presence of an internal pressure, can only expand slightly; besides an easier assembly, such alternative embodiment entails some advantages, such as, for example, an absence of lateral thrust on the lateral sheets/plates 23, not requiring filling in the interspaces 19 to withstand a compressive strength and, moreover, the intrinsic presence of longitudinal pipes/profiles makes arranging the fillers 61 in said interspaces not necessary.

Figure 5:
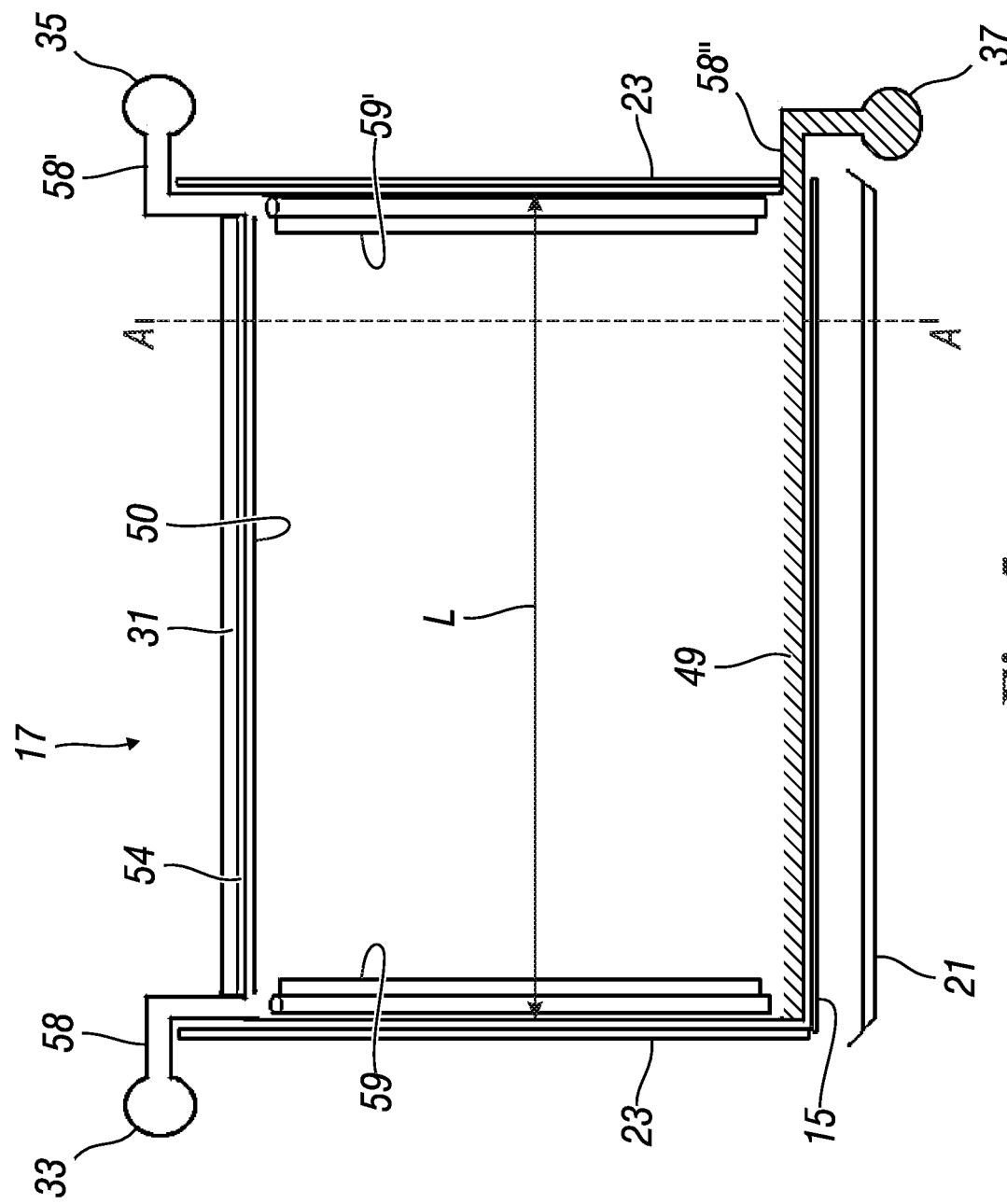
FIG. 5 schematically illustrates a detailed view of a single condensing chamber of FIG. 2.
Figure 5A:
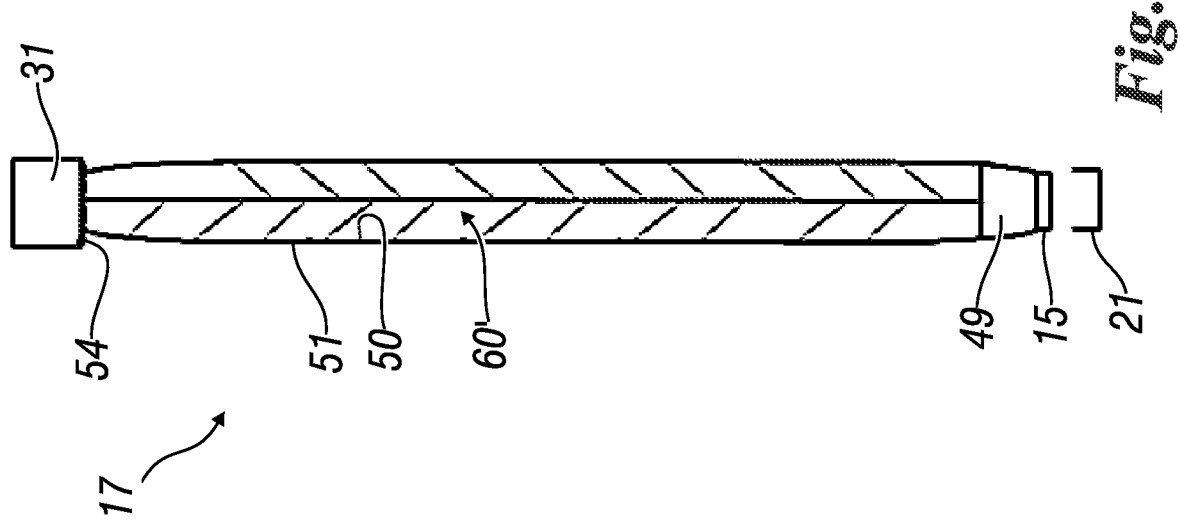
FIGS. 5A and 5B schematically illustrates vertical sections of a condensing chamber with two different embodiments of internal components or inserts of the condensing chamber of the preceding figures.

FIGS. 5 and 5A/5B show more detailed views of a single condensing chamber 17.

The single condensing chamber 17 comprises, at the upper portions opposite the lower portions facing toward the bottom 15 of the cage 14, a portion of a compressed vapour supply pipe 33 and a manifold 58 for connection to the condensing chamber 17; the section of said manifold 58 can usefully be greater than the thickness of the condensing chamber 17, given that the lateral ends of the condensing chamber can be expanded/widened up to occupying the space otherwise intended for the interspace 19 so as to allow a more adequate and wide connection between the manifold 58 and condensing chamber 17, with this task facilitated by the presence of the profiles 59 which ensure a better distribution of the compressed gas (a similar arrangement of pipes and manifolds and profiles also applies to the opposite end of the condensing chamber 14 for purging the vapour enriched with atmospheric gases (the corresponding references are indicated by 35, 58', 59') and for the purging of the condensed water positioned at the lower portion opposite the aforementioned upper portion (the corresponding references are indicated with 37 and 58").

Figure 5B:
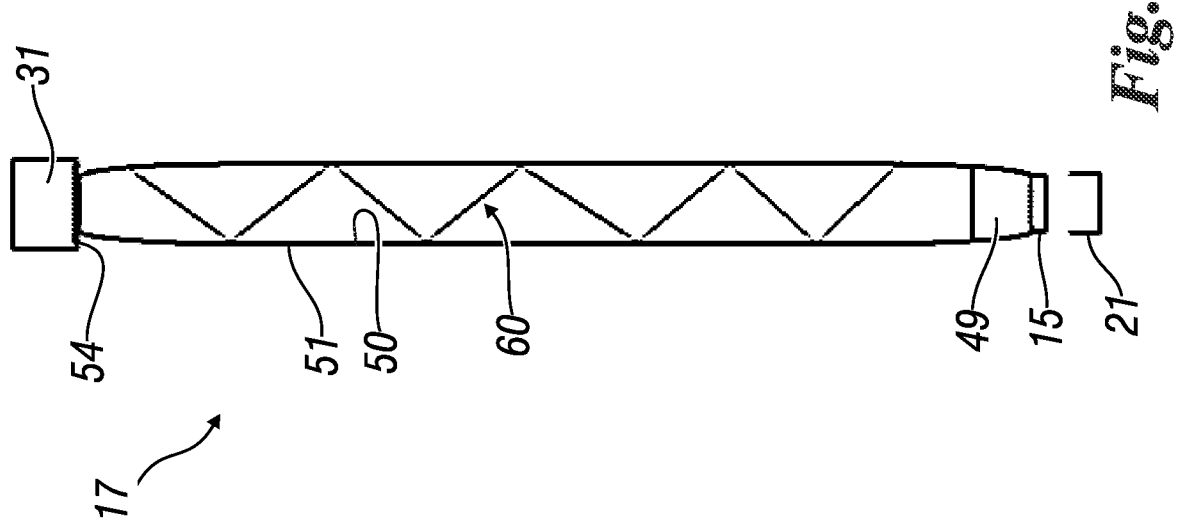

With reference to FIG. 5A, schematised are the exemplifying sections of inserts (indicated, respectively, with 60 in FIG. 5A and with 60' in FIG. 5B) of the condensing chambers 17. In view of the greater pressure present inside these chambers, the said inserts 60/60' do not have the function of providing a mechanical support, but a different utility; in particular, the profile 60, which is schematised in greater detail in FIG. 7 as an undulated structure, has the function of regularly conveying the compressed vapour in its path from the supply side to the opposite purge side where it reaches, following the condensation of most of it, with a remarkable enrichment of the atmospheric gases that were dissolved in the saline water supplied and preferably consists of a thin plastic sheet thermoformed in a zigzag-like manner with an angle of about 90° and it is arranged with the grain in horizontal and bearing engraved grooves so as to allow the water that condenses to reach the bottom of the condensing chamber so as to be purged through the manifold 58". The insert 60, thus structured, avoids the formation, in the condensing chambers 17, of "dead areas" to the condensation which can be formed because of an excessive presence of atmospheric gases and which could entail an excessively high rise in the compression pressure required to obtain the condensation, said insert ensures a more regular and uniform conveyance and concentration of said gases.

The shape of the profile of the insert 60 was designed to allow a lower pressure loss due to resistance to motion considering the same thickness of the condensing chamber.

On the other hand, the profile of the insert 60' was designed for applications of a smaller extension length L of the condensing chamber 17 or for condensation situations in which the atmospheric gases have already been substantially eliminated and it has the function, by means of a great number of strands made of hydrophilic materials and facing upwards, to make the condenser water layer on the surface of the condensing chamber 17 thinner; being one of the main factors responsible for the resistance to the thermal transmission, a narrowing of such condenser water layer allows to improve the overall coefficient of thermal exchange and to increase, with the other parameters being equal, the hourly yield per unit of surface.

Figure 6B:
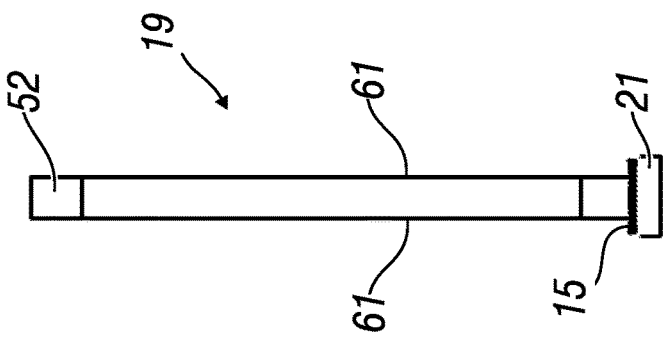
FIGS. 6, 6A and 6B schematically represent front, top and lateral views of an interspace of the preceding figures.
Figure 6:
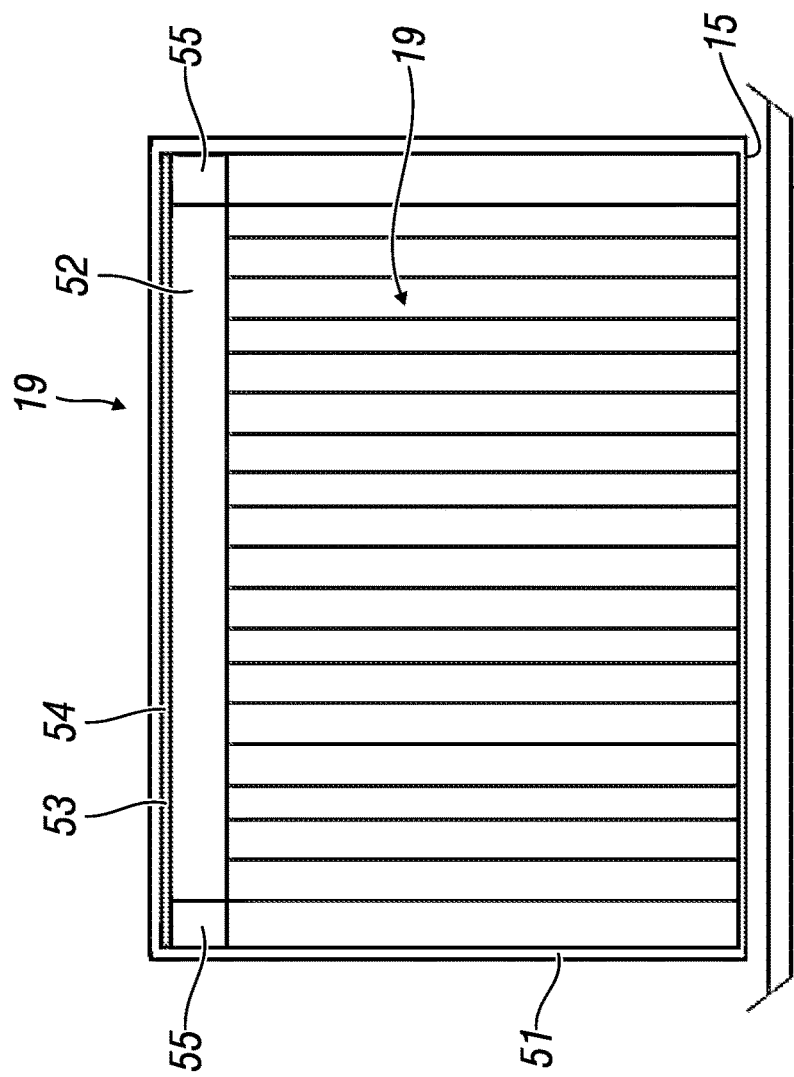
Figure 6A:
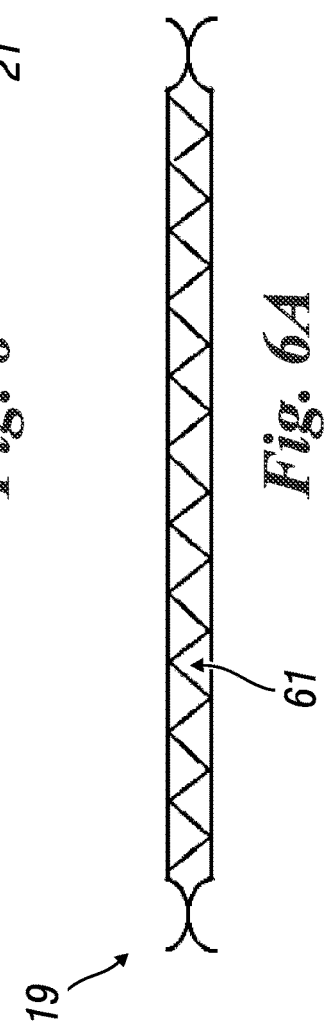

The characteristics of an interspace 19 are illustrated with reference to FIGS. 6, 6A and 6B.

The existence of an interspace 19 between the surfaces of two condensing chambers 17 subjected to pressure is exclusively allowed by the presence of spacer inserts 61 which counter these pressures and provide support points as close as possible so as to make the use of the available plastic films thinner, such as the walls of the condensing chambers (plastic films supported in the resistance to deformation also by the thin fabric 51); said spacer inserts 61 must also simultaneously allow the purging of the vapour generated with the least possible resistance (any resistance to the motion of the vapour leads to a loss of efficiency of the device).

It should also be observed that the spacer inserts have a "zigzag-like" profile with an acute angle as shown in FIG. 7C or with a profile of the type indicated in FIG. 7D and they are arranged with the grooves vertically so as to allow the vapour to flow out from the lower side of the interspace and then, passing through the perforated sheet or mesh of the bottom 15, to flow out from the "stack" or block 16 too; such profiles provide a proportionally higher number of closely-knit support points and a correspondingly higher compressive strength as the thickness of the interspace reduces, the aforementioned thickness being possibly advantageously reduced to the limit of about 5 mm required to provide a vapour outlet without excessive pressure losses.

The characteristics of the apparatus of the invention are described below with reference to its thermal balance.

Besides electric consumption, which is substantially identified with that of the compressors 18, the apparatus according to the present invention requires two different heat inputs: one to be supplied inside the container element 12 and one to complete the heating of the supply water up to the initial boiling temperature in the tanks 22; in order to assess the extent of these thermal contributions, it is necessary to examine different thermal balances and, in particular, the one regarding only the container element 12 and the global one that also includes the thermal consumption to bring the saline water in the tanks 22 to boiling and—besides these—also the more specific heat input of the heat exchangers in counterflow 20.

As regards the thermal balance relating only to the container element 12, below are the factors characterising it:

a) the conductive thermal losses attributable to the temperature difference of the various components of the container element 12 with the environment; these are heat losses which, at least partly, also depend on the extent of the thermal insulation and which do not have a particularly important impact for not too small plants;

b) heat losses due to the fact that the saline water of increased concentration which is purged (reference 40 in FIG. 1) has a temperature higher than that of the supply water coming from the tanks 22 (with a temperature difference equal to the BPE (Boiling Point Elevation) difference between the initial and final saline concentrations); a similar situation occurs for condensed water purges, although to a slightly smaller extent since condensation occurs in several stages;

c) thermal losses due to vapour purges for the evacuation of atmospheric gases and other inevitable low vapour losses;

d) the positive heat input due to the fact that basically all the electric energy consumed for compression is converted into heat, taking into account the fact that the process of separation of the saline solution into distilled water and more concentrated solution shows a substantial invariance of enthalpy.

The factors referred to in sections a), b) and d) tend to compensate for or show a small excess heat when thermal insulation is very efficient and compression efficiency is low; otherwise (i.e. when the insulation is not appropriate and the compression efficiency is not low) a heat loss may be observed.

As regards the factor referred to in section c), the contribution thereof may be decisive, particularly in the absence of solutions to reduce the impact of the problem relating to atmospheric gases; as a matter of fact, a 1% purge of the vapour produced involves a thermal loss of about 6.3 kWh/t, a value which is well higher than the connected compression electric energy that is lost with such purge (equal to about 0.04-0.05 kWh/t).

Considering the overall thermal balance of the apparatus, the following factors are observed:

e) conductive/convective thermal losses attributable to the difference in temperature with the environment of the various components of the device (including heat exchangers 20 in counterflow and storage tanks 22/24) are heat losses which also partly depend on the extent of the thermal insulation and still hold little significance for plants that are not too small;

f) heat losses due to the condensate and concentrated saline water purges generated in the process and due to the difference in temperature with the supply water after the heat exchange in heat exchangers 20 in counterflow (it should be borne in mind that the heat exchangers 20 in counterflow are essential for achieving a good thermal balance. As a matter of fact, said heat exchangers must allow the recovery of most of the heat contained in the effluents for a substantial reduction of the thermal losses (however, the inability to eliminate the temperature differences between the output effluent and the supply water means that such losses are a particularly important factor);

g) furthermore, inevitable small losses of vapour which cannot be channeled into the heat exchangers 20 in counterflow must also be taken into account;

h) considering the losses, there is the positive contribution depending on the fact that all the electric energy consumed for compression is converted into heat.

However, the aforementioned positive contribution is not sufficient to compensate for thermal losses and, furthermore, it is still necessary to provide a portion of thermal energy also for various different purposes such as, for example, i) producing the initial heating of the supply water and the vapour to boiling temperature to allow the plant to start, ii) completing the heating of the preheated supply water in the heat exchangers 20 in counterflow (reference is made to the thermal energy supply means 25 arranged at the at least one tank 22) to the boiling temperature, iii) compensating by producing vapour (by means of the further thermal energy supply means 26 arranged at the container element 12) in the container element 12 the thermal losses due to the purges made necessary by the presence of atmospheric gases present in the supplied water), iv) maintaining the evaporation container in a very slight overpressure if it is opted to operate at atmospheric pressure and without a structure proving the complete pressure tightness, so as to prevent any possibility of air entering which would be very harmful. For this purpose it may be useful to arrange inside the container 12 the buffer spaces/volumes full of the vapour contained in the container 12 which, in communication with the outside, can absorb any pressure changes inside the container 12, for example, due to the starting of the compressors or external pressure excursions, for example, due to wind blows.

As regards the thermal balance of the heat recovery with the heat exchangers 20 in counterflow, they have the function of preheating the supply water and bringing it to the temperature as close as possible to the initial boiling temperature of the process; the missing heating differential must then be supplied as thermal energy and therefore the greatest possible efficiency is important.

The flows that can be used for this preheating are of three different types: a) the concentrated salinity water at the end of the process, b) the condensed fresh water and c) the vapour purges linked to the presence of atmospheric gases and those of the possible step of slight boiling to complete the heating to the BPT (Boiling Point Temperature) in the tanks 22.

Furthermore, for this heat exchange process by means of the exchangers 20 in counterflow, it should be observed that the thermal capacity (mass×specific heat) of the outgoing aqueous flows would be equal to that of the incoming flow; however, since a small part of the supply water is separately preheated by the vapour purge, the thermal capacity of the outgoing hot flows is higher than that of the water supplied in counterflow thereto (this decreases, considering the same overall coefficient of thermal exchange, the temperature delta$\Delta$ (T) between the preheated liquid and the heating liquids). Furthermore, the average temperature of the two outgoing liquid flows is slightly higher (about 0.4-0.8° C.) than that at which the supply water is to be heated (i.e. The boiling temperature at the initial saline concentration or BPT) and the vapours purged—by condensing in the heat exchanger—have the capacity to heat the supply water (in the measure of about 0.6% of the water for every kW h/t equivalent of the latent condensation heat thereof).

The desalination apparatus described above with reference to the construction characteristics entails the resolution of many problems.

As known, sea water contains dissolved therein a small amount of atmospheric gas equal to about 650 micromoles per litre and at atmospheric pressure and at the temperature of 100° C. the volume of such gases corresponds to about 19.5 ml/litre. This is a minimum amount with respect to the volume of the vapour that is generated and, however, in so far as these gases are not dispersed during the heating step that precedes the supplying into the evaporation container (the solubility thereof decreases as the temperature increases, but the release process is not complete and immediate), they are then released into the device in the water evaporation step and, if not eliminated, they will concentrate in the condensing chambers 17 in the vapor condensation step; since the partial pressure thereof must be subtracted from the total pressure to determine the useful pressure of the vapour for condensation at the desired temperature, the presence initially involves a slowing down of the condensation until it stops completely. The presence of atmospheric gases dissolved in the supply saline water therefore entails the need to purge the vapour which was enriched with such gases.

If not minimised, vapour purges pose the problem, not so much of higher unit consumption of electric energy, but rather relating to thermal losses which entail the need to supplement heat inputs into the container element 12.

To get an idea of the extent of such purges and the related energy costs, the following examples are given:

assuming the extreme case that there was no release of the aerobic gases during the heating step at 100° C. and that evaporation concerns 50% of the supplied water (e.g. concentration from 35 ppt to 70 ppt), the partial pressure developed by these atmospheric gases at 100° C. would be about 2.4 Pa;

in the condensing chamber by applying a 1% purge of the compressed vapour supplied, the partial pressure of the compressed gas would reach 240 Pa (or 120 or 480 Pa if the purge respectively amounted to 2% or 0.5% etc.);

a 1% purge of vapour would result in an increase in electric energy consumption, under conditions of ideal compression efficiency of about 0.11 kWh/t in addition to the loss of 1% of the vapour produced, i.e., about 0.13 kWh/t and assuming a real compression yield, for example, of 65% would result in a loss of about 0.20 kWh/t, but above all it would result in an increase in the thermal energy to be supplied to the container element 12 of about 6.3 kWh/t (the same exercise would see with the purge of 2% an increase in electricity consumption of about 0.13 kWh/t and a required heat input of about 12.6 kWh/t or with a purge of 0.5% an increase in electricity consumption of about 0.36 kWh/t and a required heat input of about 3.2 kWh/t).

The apparatus of the invention allows to solve such problems considering the fact that if one operates at atmospheric pressure it is possible not to stop the heating of the water in the tanks 20 upon reaching the boiling temperature, but it is also possible to carry out even a short boiling period that allows the stripping of most of the atmospheric gases.

In addition, in light of the above with reference to the construction characteristics of the apparatus, the condensing chambers 17 are provided with inserts 60 which allow to have a whole part of the path in the condensing chamber 17 with little or no burden in terms of energy and kinetic efficiency.

Furthermore, evaporation can be carried out progressively in several steps, i.e. the various evaporation sections of the container element 12 or at least the first one of such sections can be kept separate using septa or partitions 45 with a perforated surface and position—in the last compartment or section of said container element 12—the further means 26 for supplying thermal energy arranged at the container element 12 to produce the vapour required to compensate the purges. The atmospheric gases are mostly released during the percolation step in the first sector of the container element 12 and they will be confined here given that, since it is from this sector that most of the purges will flow out but the restoring vapour is generated in the last compartment of the container element, there will be a flow from the final section to the initial section of the container which will prevent the diffusion of atmospheric gases into the other compartments.

In this operating situation, by increasing the threshold of partial pressure of the atmospheric gases to be set for purging in the first compartment of the container element (for example, at about 2400 Pa so as to operate at about the same compression pressure applied in the last sector of the container element, the energy losses at the first step/s are limited, with a strong reduction at global level of the losses of electric energy and of the heat input to be supplied (remaining in the above example with a concentration from 35 ppt to 70 ppt in 7 steps, the losses of electric energy are reduced to about 0.15 kWh/t and the heat input to be supplied to compensate the purges to only 0.7 kWh/t).

Under the operative conditions of the desalination process at ambient pressure, the vapor is characterised by a very low coefficient of kinematic viscosity, slightly lower than that of the air and this fact greatly facilitates the task of keeping at low levels the resistance to motion inside the condensing chamber 17 and the evaporation interspace 19; as a matter of fact, the resistance of the vapour to motion tends to lower the pressure differential which promotes condensation/evaporation and at the same time the temperature differential which promotes the transmission of heat and therefore the quantitative yield in the unit of time or alternatively, should the pressure loss be compensated by a higher inlet compression pressure, it results in a loss of efficiency in the kWh per ton ratio of condensed water.

Figure 7:
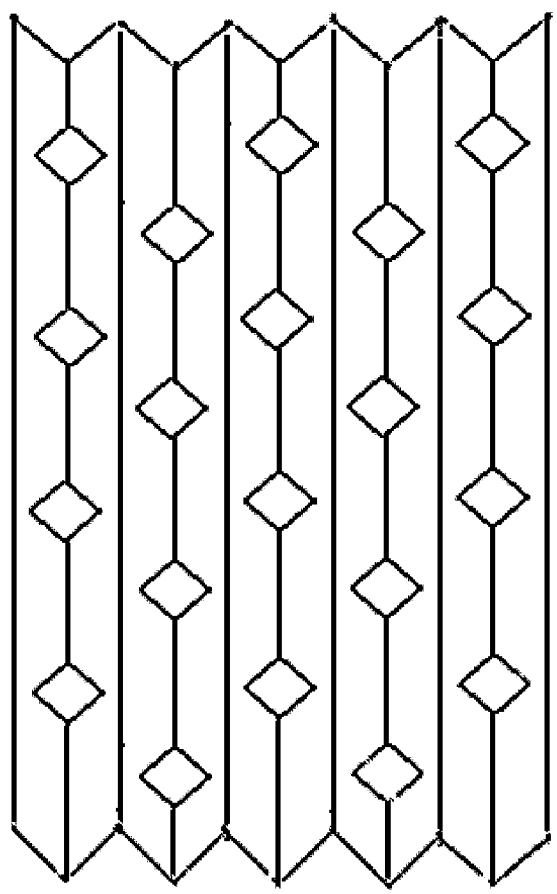
FIGS. 7 and 7A schematically illustrate a view of an insert of a condensing chamber.
Figure 7A:

In order to avoid these problems, the evaporation interspaces 19 of the apparatus of the invention have a spacer insert with a profile as schematically shown in FIG. 7C by the reference number 61A or 61B in FIG. 7D, profiles which, considering the same thickness of the interspace and efficiency in the function of providing points of support and resistance to the pressure exerted by the vapour of the condensation chambers, allow the formation of the pipes for the evacuation of the vapour produced with the widest possible cross-section, while the inserts of the condensing chambers 17 have a profile of the type schematically shown in FIGS. 7 and 7A which allows an effective channeling of the vapour from the inlet area to the purge area with micro-pipes having the widest possible cross-section considering the same thickness and length of the condensing chamber.

The amount of compression required for the operation of the apparatus of the invention is very low and normally less than 150 mbar. The kinematic viscosity of the saturated vapour at 1 atm (atmosphere) is about 5% lower than that of the air at the same temperature.

A characteristic of the apparatus of the invention lies in advantageously using a plurality of compressors 18 which can operate at different pressures and this allows to save energy given that compression pressure is required in various steps of progressive concentration of the saline supply that is different and progressively increasing; moreover, the flow rate and therefore the operating pressure of the compressors can be modulated according to the need for condensed water required and the efficiency in terms of unit energy consumption increases by operating at a low rate.

Besides the differential between the boiling temperature and the temperature at which the compression pressure can produce condensation, the amount of condensate produced by the device depends on several factors highlighted among which is the overall coefficient of thermal exchange. This overall coefficient of thermal exchange depends on numerous factors such as the thickness and thermal conductivity of the separation diaphragm between the evaporation area and the condensation area, the thickness and motion of the water layers which form on the condensation surface and which percolate on the evaporation side (the possible values of the overall coefficient of thermal exchange in the apparatus of the invention belong to a rather wide range that can be estimated indicatively between 300-800 W/(m$^2$×° C.).

Other conditions being equal, the apparatus of the invention can operate with higher production by increasing the amount of the vapour supply in the condensation chambers 17 and consequently the compression pressure; however, this is at the expense of the unitary consumption of electric energy. To clarify better, table 1 (and table 1a) schematically shows the values reported with reference to 1 m³ of evaporation "stack" operating at 1 atm and some exemplifying values of hourly and daily production with relative energy consumption and as a function of the compression efficiency and of the temperature differential (and therefore also of pressure) between the condensing chamber and the evaporation interspace, all for two different levels of final concentration of 55 ppt and 70 ppt based on a 35 ppt supply.

The table also shows the data relating to the thermal energy consumption as a function of the temperature differential in order to bring the supply water to boiling from the temperature at which the heat exchangers, by virtue of their higher or lower efficiency, were able to preheat it. It should be observed that although in overall energy terms the 70 ppt concentration solution is the favourite one, the 55 ppt concentration solution is preferable since in this case, under the indicated operating conditions, there is not reached the level of saline concentration at which there can be formed precipitates of CaSO4 salts (calcium sulphate), the so-called "scaling" phenomenon, which is very annoying and requires at least partial pre-treatments of the supply water; from this point of view, the progressive concentration of the saline solution limits—to the last concentration stages—the possible formation of scale which should occur due to possible errors/malfunctions and the great accessibility of the device would limit the negative impact which is, on the contrary, much more serious in the devices according to the known technology of "vapour compression distillation".

TABLE 1

Concentration supply water from 35 ppt to 70 ppt

Input data

| working pressure = atm | | | 1 |
|---|---|---|---|
| global coefficient of heat exchange:h: w/(m2*° C.) | | | 400 |
| compression efficiency  >> | 65% | 75% | 85% |

Indicative energy consumption E.E.

| Delta T condensing chamber ° C. | Delta P condensing chamber mbar | Production condensate for 1 m3 stack liters/hour | Production condensate for 1 m3 stack m3/die | Production 1 container 40" (48 m3) m3/die | Indicative energy consumption E.E. eff. Compr. 65% kwh/t | Indicative energy consumption E.E. eff. Compr. 75% kwh/t | Indicative energy consumption E.E. eff. Compr. 85% kwh/t |
|---|---|---|---|---|---|---|---|
| 1.75 | 62.8 | 78.01 | 1.9 | 90 | 3.96 | 3.43 | 3.03 |
| 2.0 | 71.8 | 109.9 | 2.6 | 127 | 4.60 | 3.98 | 3.52 |
| 2.5 | 89.5 | 173.7 | 4.2 | 200 | 5.87 | 5.09 | 4.49 |
| 3.0 | 107.7 | 237.5 | 5.7 | 274 | 7.15 | 6.20 | 5.47 |
| 3.5 | 125.6 | 301.3 | 7.2 | 347 | 8.43 | 7.30 | 6.44 |
| 4.0 | 143.5 | 365.1 | 8.8 | 421 | 9.70 | 8.41 | 7.42 |
| 4.5 | 161.5 | 428.9 | 10.3 | 494 | 10.98 | 9.51 | 8.39 |
| 5.0 | 179.4 | 492.7 | 11.8 | 568 | 12.25 | 10.62 | 9.37 |

Indicative energy consumption thermal energy
thermal consumption = A) consumption to heat supply water + B) consumption to recover vapour lost in purges
A) Input data:

| supply water/condensed water ratio | 2 |
|---|---|

| Final DT between suplly water from counterflux heat exchanger and BPT ° C. | Thermal energy to heat supply water for t of condensed water= kWh/t |
|---|---|
| 3 | 6.7 |
| 5 | 11.2 |
| 7 | 15.7 |

B) Input data:

| percentage vapour purges | Thermal energy to recover vapour lost in purges= kWh/t |
|---|---|
| 0.10% | 0.6 |
| 0.25% | 1.6 |
| 0.50% | 3.1 |
| 0.75% | 4.7 |

TABLE 1a

Concentration supply water from 35 ppt to 70 ppt

Input data

| working pressure = atm | | | 1 |
|---|---|---|---|
| global coefficient of heat exchange:h: w/(m2*° C.) | | | 400 |
| compression efficiency  >> | 65% | 75% | 85% |

TABLE 1a-continued

Concentration supply water from 35 ppt to 70 ppt

Indicative energy consumption E.E.

| Delta T condensing chamber ° C. | Delta P condensing chamber mbar | Production condensate for 1 m3 stack liters/hour | Production condensate for 1 m3 stack m3/die | Production 1 container 40" (48 m3) m3/die | Indicative energy consumption E.E. eff. Compr. 65% kwh/t | Indicative energy consumption E.E. eff. Compr. 75% kwh/t | Indicative energy consumption E.E. eff. Compr. 85% kwh/t |
|---|---|---|---|---|---|---|---|
| 1.50 | 53.8  | 81.62 | 2.0  | 94  | 3.8   | 3.53  | 2.91 |
| 1.72 | 61.7  | 109.7 | 2.6  | 126 | 4.36  | 4.05  | 3.39 |
| 2.00 | 71.8  | 145.4 | 3.5  | 168 | 5.08  | 4.71  | 3.88 |
| 2.50 | 89.5  | 209.2 | 5.0  | 241 | 6.35  | 5.5   | 4.86 |
| 2.72 | 98.0  | 237.3 | 5.7  | 273 | 6.91  | 6.42  | 5.29 |
| 3.00 | 107.7 | 273.0 | 6.6  | 315 | 7.63  | 7.08  | 5.83 |
| 3.50 | 125.6 | 336.8 | 8.1  | 388 | 8.90  | 8.27  | 6.81 |
| 3.72 | 133.5 | 364.9 | 8.8  | 420 | 9.47  | 8.79  | 7.24 |
| 4.00 | 143.5 | 400.6 | 9.6  | 461 | 10.18 | 9.45  | 7.78 |
| 4.50 | 161.5 | 464.4 | 11.1 | 535 | 11.46 | 10.64 | 8.76 |
| 5.00 | 179.4 | 528.2 | 12.7 | 608 | 12.73 | 11.82 | 9.74 |

Indicative energy consumption thermal energy
thermal consumption = A) consumption to heat supply water + B) consumption to recover vapour lost in purges
A) Input data:

| supply water/condensed water ratio | 2.75 |
|---|---|

| Final DT between suplly water from counterflux heat exchanger and BPT ° C. | Thermal energy to heat supply water for t of condensed water= kWh/t |
|---|---|
| 3 | 9.2 |
| 5 | 15.4 |
| 7 | 21.6 |

B) Input data:

| percentage vapour purges | Thermal energy to recover vapour lost in purges= kWh/t |
|---|---|
| 0.10% | 0.6 |
| 0.25% | 1.6 |
| 0.50% | 3.1 |
| 0.75% | 4.7 |

The advantages attained by the apparatus for the desalination of sea water of the present invention are observable in the light of the above.

The apparatus of the invention comprises a container element (which houses the evaporation means) which is not at direct contact with the saline water and, thus, reduces the problems linked to the corrosion and to the deposition of sediments, encrustations and the like thereon.

A further advantage lies in the fact that the apparatus of the invention operates substantially at ambient pressure (therefore at a temperature range of 100° C.-103° C.) and, therefore, the container element can be defined by a simple, light, cost-effective structure, which can be inspected, modular and, given the absence of direct contact with saline water, made of a material also different from corrosion-resistant metals and even non-metal material.

Further advantageous is the fact the apparatus of the invention uses—for evaporation and condensation—compact stacks of large but very thin condensing chambers made of plastic material alternating with thin interspaces, evaporation stacks with much greater evaporation surface/weight and evaporation surface/volume unit ratios with respect to metal pipes generally used by the prior art and, therefore, utilises structures with much higher coefficients of thermal exchange per volume unit, besides being lighter, less expensive, not prone to corrosion.

A further advantage lies in the fact that the arrangement in stacks and cages with the creation of the upper layer 31 of water and the percolation along the vertical walls of the condensing chambers constitute a very effective arrangement not only in providing very high thermal exchange surface per unit of volume ratios, but also an ideal arrangement for producing evaporation without boiling and for grouping and simplifying all the various and required connections for supplying water and compressed vapour and for purging concentrated saline solution, condensed water and purge vapours.

A further advantage lies in the fact that the supply water is made to percolate along the vertical walls constituted by condensing chambers intervalled with evaporation interspaces and collected in blocks and which can be partly recycled in the upper part of the block stack and partly sent to the next block to proceed in the progressive concentration.

A further advantage in the energy efficiency of the process lies in the fact that the apparatus of the invention allows evaporation to be carried out in several stages at increasing compression pressures simultaneously with the progressive increase in concentration of the saline solution, but always inside a single container element.

Further advantageous is the fact that evaporation without boiling allows to have a vapour completely devoid of salts and this entails not having risks of corrosion in the compressor and condensed water completely devoid of salts and, therefore, there is no need for, as occurs in the prior art, devices suitable to eliminate, but never completely, the small droplets which form and disperse in the vapor in such devices and which contain salts which cause corrosion problems.

A further advantage lies in the fact that by exploiting the possibility of operating in more successive stages compartmentalised with thin sheets or perforated sheets, the apparatus of the invention can reduce the overall amount of purging of the vapours containing the atmospheric gases, concentrating it substantially to the level of evaporation that occurs in the first stage (or in the first stages) with an effective reduction in the overall amount of the purges themselves.

Though the invention has been described above with particular reference to an embodiment thereof provided solely by way of non-limiting example, numerous modifications and variants shall be clear to a man skilled in the art in the light of the description above. Thus, the present invention protects all modifications and variants that fall within the scope of protection of the claims that follow.

The invention claimed is:
1. An apparatus (10) for desalination of sea water through vapour compression distillation, comprising:
   a thermally insulated container element (12) including at least two cages (14), each of the at least two cages (14) comprising:
      at least one block (16) formed by a plurality of condensing chambers (17) alternating with a plurality of evaporation interspaces (19) arranged between the condensing chambers (17),
      a collection tank (21) for collecting a saline solution percolated by the block (16),
      a bottom (15) supporting said at least one block (16) and which is raised/spaced with respect to the collection tank (21),
      side walls (23) extending from the bottom (15) and above an upper edge of the plurality of condensing chambers (17) and reinforced on the outside by reinforcement crosspieces (23'),
      a compressed vapour supply pipe (33) arranged in the upper part of each cage of the at least two cages (14) on the opposite side with respect to the collection tank (21),
      a vapour-purging pipe (35) with atmospheric gases arranged in the upper part of each cage of the at least two cages (14) on the opposite side with respect to the compressed vapour supply pipe (33),
      a further pipe (37) for collecting condensed water arranged in the lower part of each cage (14) of the at least two cages (14) and facing the tank (21), and
      septa or partitions (45) for separating each of the cages (14) with a perforated surface arranged for separation between the block (16) of each cage (14) suitable to achieve a unidirectionality in the movement of the vapour inside the container (12);
   at least two low-pressure compressors (18) operating at differentiated pressure;
   at least three heat exchangers (20);
   at least one supply tank (22) for collecting and final heating supply water preheated by the at least three heat exchangers (20);
   at least one further tank (24) for collecting condensed water;
   a first heater (25) for supplying thermal energy at the at least one supply tank (22); and
   a second heater (26) for supplying thermal energy at the container element (12);
   the at least three heat exchangers (20) being of the counterflow type for preheating the sea water in connection with concentrated saline water purges (40), with condensed fresh water (42), with the vapour purges (44 and 44'), with the at least one supply tank (22), with the at least one further tank (24) and with a source of sea water (41).

2. The apparatus according to claim 1, wherein the at least two compressors (18) are arranged above the container element (12) to suction the vapour produced in said container element (12) and connected to each block (16) of each cage (14) by means of pipes or ducts (30).

3. The apparatus according to claim 1, wherein the container element (12) carries out evaporation in a plurality of stages of progressive concentration of the supply saline water at ambient pressure.

4. The apparatus according to claim 1, wherein the bottom (15) comprises a perforated sheet or of a mesh supported by a grid.

5. The apparatus according to claim 1, wherein the condensing chambers (17) of the block (16) comprise a film (50), the evaporation interspaces (19) comprising, at an upper end portion opposite the end portion facing toward the bottom (15) of each cage (14), plugs (52) made of rubber and/or spongy material which close—at the top of—said evaporation interspaces (19) and partially press against an upper portion of the condensing chambers (17) due to the elastic force thereof and/or due to the pressure exerted by the compressed vapour in said condensing chambers (17) and allow the formation and containment of a saline solution layer (31), a layer (54) being arranged above the plugs (52) and being made of porous material to define a filter of any particulates present in the saline supply solution which percolates into the block (16), an interface part of the upper part of the condensing chambers (17) with the side walls of each cage (14) comprising sealing elements (55) suitable to prevent uncontrolled percolation of liquid from the saline solution layer (31).

6. The apparatus according to claim 1, wherein the condensing chamber (17) comprises, at upper portions opposite the lower portions facing toward the bottom (15) of each cage (14), a portion of the compressed vapour supply pipe (33) and a first manifold (58) for connection to the condensing chamber (17), on the opposite side with respect to the compressed vapour supply pipe, there being comprised a portion of the vapour-purging pipe (35) for purging the vapour enriched with atmospheric gases and a second manifold (58') for connection to the condensing chamber (17) and, at a lower portion opposite the upper portion, there being a portion of the pipe (37) for collecting the condensed water and a third manifold (58"), the section of said first, second, and third manifolds (58, 58' and 58") being greater than the thickness of the condensing chamber (17).

7. The apparatus according to claim 1, wherein at least one of the plurality of condensing chambers (17) comprises profiles (59, 59') suitable to guarantee, respectively, an improved distribution of the compressed vapour and of the purge of the vapour enriched with atmospheric gases, said profiles being arranged at the lateral end portions of the condensing chamber and connected to the manifolds (33) and (35).

8. The apparatus according to claim 1, wherein the condensing chambers (17) comprise extruded sheets of the twin-wall or cellular type.

9. The apparatus according to claim 1, wherein at least one of the plurality of condensing chambers (17) comprises a film (50) covered by a layer of hydrophilic fabric (51) having a calibrated deformability so as to allow to adjust the deformation induced by the pressure differential on the film (50) so as to compress against spacers (61) arranged in the interspace (19) and make the film (50) take an undulated profile with grain facing vertically downwards.

10. The apparatus according to claim 1, wherein the condensing chambers (17) and the evaporation interspaces (19) comprise respectively spacer inserts (60 or 60') having an undulated structure and comprising a plastic sheet thermoformed in a zigzag manner with an angle of about 90° arranged with horizontal grain to adjust the flow of compressed vapour directionally from an inlet area to a purge area after being enriched with atmospheric gases and bearing engraved grooves to allow the water that condenses to reach the bottom of the condensing chamber and then be collected, the insert (60') comprising a plurality of strands of hydrophilic materials facing upwards which rest on a film (50) with the function of draining the water which condenses at contact therewith toward the centre of the condensing chamber, thus narrowing the water layer which constitutes a resistance to heat exchange and thus improving the degree of the coefficient of thermal exchange.

11. An apparatus (10) for desalination of sea water through vapour compression distillation, comprising:
a thermally insulated container element (12) including at least two cages (14), each of the at least two cages (14) comprising:
at least one block (16) formed by a plurality of condensing chambers (17) alternating with a plurality of evaporation interspaces (19) arranged between the condensing chambers (17),
a collection tank (21) for collecting a saline solution percolated by the block (16),
a bottom (15) supporting said at least one block (16) and which is raised/spaced with respect to the collection tank (21), wherein the condensing chambers (17) of the block (16) comprise a film (50), the evaporation interspaces (19) comprising, at an upper end portion opposite the end portion facing toward the bottom (15) of each cage (14), plugs (52) made of rubber and/or spongy material which close at the top of said evaporation interspaces (19) and partially press against an upper portion of the condensing chambers (17) due to the elastic force thereof and/or due to the pressure exerted by the compressed vapour in said condensing chambers (17) and allow the formation and containment of a saline solution layer (31), a layer (54) being arranged above the plugs (52) and being made of porous material to define a filter of any particulates present in the saline supply solution which percolates into the block (16), an interface part of the upper part of the condensing chambers (17) with the side walls of each cage (14) comprising sealing elements (55) suitable to prevent uncontrolled percolation of liquid from the saline solution layer (31),
side walls (23) extending from the bottom (15) and above an upper edge of the plurality of condensing chambers (17) and reinforced on the outside by reinforcement crosspieces (23'),
a compressed vapour supply pipe (33) arranged in the upper part of each cage of the at least two cages (14) on the opposite side with respect to the collection tank (21),
a vapour-purging pipe (35) with atmospheric gases arranged in the upper part of each cage of the at least two cages (14) on the opposite side with respect to the compressed vapour supply pipe (33), and
a further pipe (37) for collecting condensed water arranged in the lower part of each cage (14) of the at least two cages (14) and facing the tank (21);
at least two low-pressure compressors (18) operating at differentiated pressure;
at least three heat exchangers (20);
at least one supply tank (22) for collecting and final heating supply water preheated by the at least three heat exchangers (20);
at least one further tank (24) for collecting condensed water;
a first heater (25) for supplying thermal energy at the at least one supply tank (22); and
a second heater (26) for supplying thermal energy at the container element (12);
the at least three heat exchangers (20) being of the counterflow type for preheating the sea water in connection with concentrated saline water purges (40), with condensed fresh water (42), with the vapour purges (44 and 44'), with the at least one supply tank (22), with the at least one further tank (24) and with a source of sea water (41).

12. The apparatus according to claim 11, wherein the at least two compressors (18) are arranged above the container element (12) to suction the vapour produced in said container element (12) and connected to each block (16) of each cage (14) by means of pipes or ducts (30).

13. The apparatus according to claim 11, wherein the container element (12) carries out evaporation in a plurality of stages of progressive concentration of the supply saline water at ambient pressure.

14. The apparatus according to claim 11, wherein the bottom (15) comprises a perforated sheet or of a mesh supported by a grid.

15. The apparatus according to claim 11, wherein the condensing chamber (17) comprises, at upper portions opposite the lower portions facing toward the bottom (15) of each cage (14), a portion of the compressed vapour supply pipe (33) and a first manifold (58) for connection to the condensing chamber (17), on the opposite side with respect to the compressed vapour supply pipe, there being comprised a portion of the vapour-purging pipe (35) for purging the vapour enriched with atmospheric gases and a second manifold (58') for connection to the condensing chamber (17) and, at a lower portion opposite the upper portion, there being a portion of the pipe (37) for collecting the condensed water and a third manifold (58"), the section of said first, second, and third manifolds (58, 58' and 58") being greater than the thickness of the condensing chamber (17).

16. The apparatus according to claim 12, The apparatus according to claim 1, wherein at least one of the plurality of condensing chambers (17) comprises profiles (59, 59') suitable to guarantee, respectively, an improved distribution of the compressed vapour and of the purge of the vapour enriched with atmospheric gases, said profiles being arranged at the lateral end portions of the condensing chamber and connected to the manifolds (33) and (35).

17. The apparatus according to claim 11, wherein the condensing chambers (17) comprise extruded sheets of the twin-wall or cellular type.

18. An apparatus (10) for desalination of sea water through vapour compression distillation, comprising:
- a thermally insulated container element (12) including at least two cages (14), each of the at least two cages (14) comprising:
  - at least one block (16) formed by a plurality of condensing chambers (17) alternating with a plurality of evaporation interspaces (19) arranged between the condensing chambers (17), wherein at least one of the plurality of condensing chambers (17) comprises a film (50) covered by a layer of hydrophilic fabric (51) having a calibrated deformability so as to allow to adjust the deformation induced by the pressure differential on the film (50) so as to compress against spacers (61) arranged in the interspace (19) and make the film (50) take an undulated profile with grain facing vertically downwards,
  - a collection tank (21) for collecting a saline solution percolated by the block (16),
  - a bottom (15) supporting said at least one block (16) and which is raised/spaced with respect to the collection tank (21),
  - side walls (23) extending from the bottom (15) and above an upper edge of the plurality of condensing chambers (17) and reinforced on the outside by reinforcement crosspieces (23'),
  - a compressed vapour supply pipe (33) arranged in the upper part of each cage of the at least two cages (14) on the opposite side with respect to the collection tank (21),
  - a vapour-purging pipe (35) with atmospheric gases arranged in the upper part of each cage of the at least two cages (14) on the opposite side with respect to the compressed vapour supply pipe (33), and
  - a further pipe (37) for collecting condensed water arranged in the lower part of each cage (14) of the at least two cages (14) and facing the tank (21);
- at least two low-pressure compressors (18) operating at differentiated pressure;
- at least three heat exchangers (20);
- at least one supply tank (22) for collecting and final heating supply water preheated by the at least three heat exchangers (20);
- at least one further tank (24) for collecting condensed water;
- a first heater (25) for supplying thermal energy at the at least one supply tank (22); and
- a second heater (26) for supplying thermal energy at the container element (12);
- the at least three heat exchangers (20) being of the counterflow type for preheating the sea water in connection with concentrated saline water purges (40), with condensed fresh water (42), with the vapour purges (44 and 44'), with the at least one supply tank (22), with the at least one further tank (24) and with a source of sea water (41).

19. The apparatus according to claim 18, wherein the at least two compressors (18) are arranged above the container element (12) to suction the vapour produced in said container element (12) and connected to each block (16) of each cage (14) by means of pipes or ducts (30).

20. An apparatus (10) for desalination of sea water through vapour compression distillation, comprising:
- a thermally insulated container element (12) including at least two cages (14), each of the at least two cages (14) comprising:
  - at least one block (16) formed by a plurality of condensing chambers (17) alternating with a plurality of evaporation interspaces (19) arranged between the condensing chambers (17), wherein the condensing chambers (17) and the evaporation interspaces (19) comprise respectively spacer inserts (60 or 60') having an undulated structure and comprising a plastic sheet thermoformed in a zigzag manner with an angle of about 90° arranged with horizontal grain to adjust the flow of compressed vapour directionally from an inlet area to a purge area after being enriched with atmospheric gases and bearing engraved grooves to allow the water that condenses to reach the bottom of the condensing chamber and then be collected, the insert (60') comprising a plurality of strands of hydrophilic materials facing upwards which rest on a film (50) with the function of draining the water which condenses at contact therewith toward the centre of the condensing chamber, thus narrowing the water layer which constitutes a resistance to heat exchange and thus improving the degree of the coefficient of thermal exchange,
  - a collection tank (21) for collecting a saline solution percolated by the block (16),
  - a bottom (15) supporting said at least one block (16) and which is raised/spaced with respect to the collection tank (21),
  - side walls (23) extending from the bottom (15) and above an upper edge of the plurality of condensing chambers (17) and reinforced on the outside by reinforcement crosspieces (23'),
  - a compressed vapour supply pipe (33) arranged in the upper part of each cage of the at least two cages (14) on the opposite side with respect to the collection tank (21),
  - a vapour-purging pipe (35) with atmospheric gases arranged in the upper part of each cage of the at least two cages (14) on the opposite side with respect to the compressed vapour supply pipe (33), and
  - a further pipe (37) for collecting condensed water arranged in the lower part of each cage (14) of the at least two cages (14) and facing the tank (21);
- at least two low-pressure compressors (18) operating at differentiated pressure;
- at least three heat exchangers (20);
- at least one supply tank (22) for collecting and final heating supply water preheated by the at least three heat exchangers (20);
- at least one further tank (24) for collecting condensed water;
- a first heater (25) for supplying thermal energy at the at least one supply tank (22); and
- a second heater (26) for supplying thermal energy at the container element (12);
- the at least three heat exchangers (20) being of the counterflow type for preheating the sea water in connection with concentrated saline water purges (40), with condensed fresh water (42), with the vapour purges (44 and 44'), with the at least one supply tank (22), with the at least one further tank (24) and with a source of sea water (41).

* * * * *